Jan. 18, 1949.   E. H. LEHMAN   2,459,229
FRICTION SHOCK ABSORBER
Filed March 11, 1944
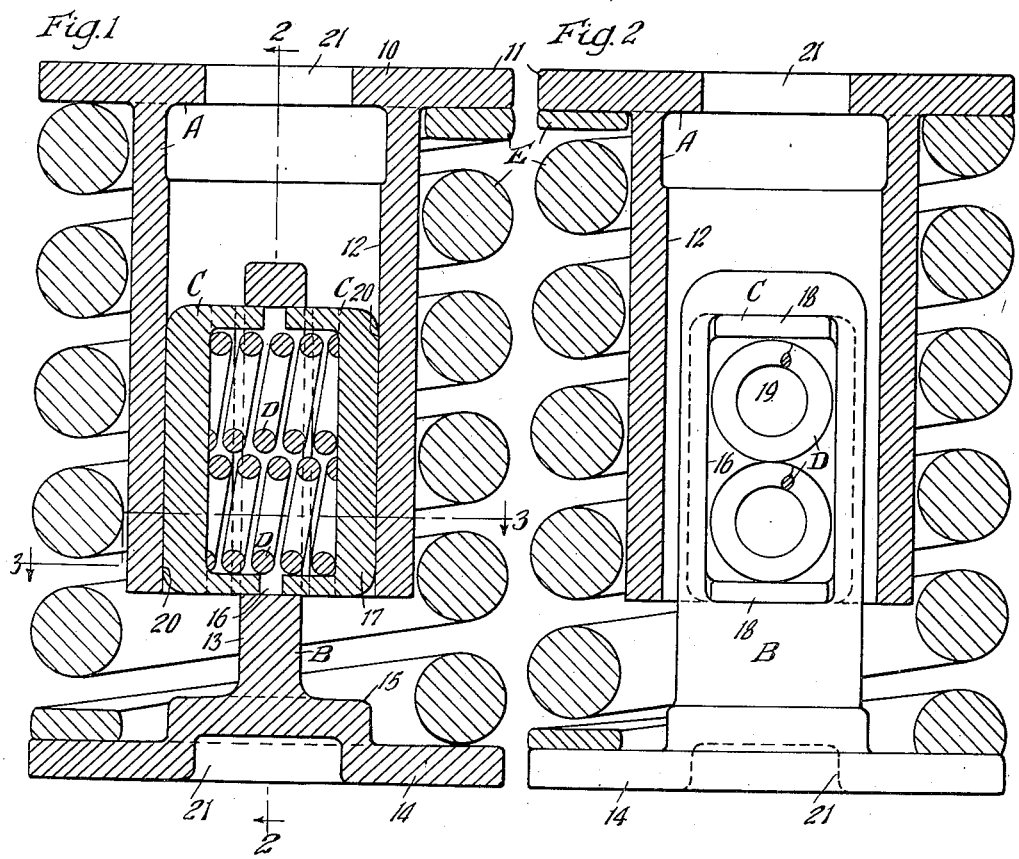
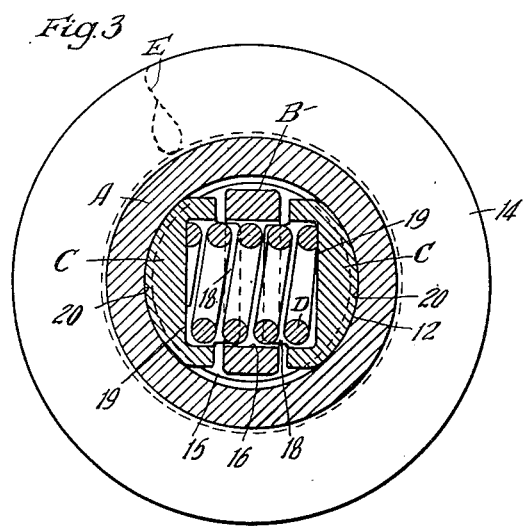
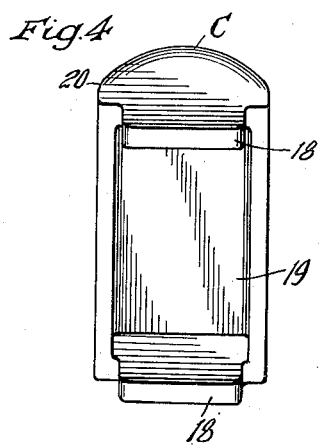
Inventor
Edward H. Lehman
By Henry Fuchs
Atty.

Patented Jan. 18, 1949

2,459,229

UNITED STATES PATENT OFFICE 2,459,229

FRICTION SHOCK ABSORBER

Edward H. Lehman, Chicago, Ill., assignor to W. H. Miner, Inc., Chicago, Ill., a corporation of Delaware Application March 11, 1944, Serial No. 525,976

2 Claims. (Cl. 267—9)

This invention relates to improvements in friction shock absorbers, especially adapted for use in connection with railway car truck springs for snubbing or dampening the action of the same.

One object of the invention is to provide simple and efficient means for snubbing or dampening the action of truck springs of railway cars, wherein the frictional resistance produced is substantially constant throughout operation of the device.

A more specific object of the invention is to provide a friction shock absorbing device comprising a friction casing, shoes having sliding frictional engagement with the interior walls of the casing, and spring resistance means opposing relative movement of the shoes and casing, wherein the shoes are carried by a yoke lengthwise movable with respect to the casing and the shoes are spread apart against the friction surfaces of the casing by spring means under predetermined compression.

Other objects of the invention will more clearly appear from the description and claims hereinafter following.

In the drawing forming a part of this specification, Figure 1 is a longitudinal central vertical sectional view of my improved shock absorber. Figure 2 is a vertical sectional view, corresponding substantially to the line 2—2 of Figure 1, showing the yoke and lower follower in elevation. Figure 3 is a horizontal sectional view, corresponding substantially to the line 3—3 of Figure 1. Figure 4 is a perspective view of one of the friction shoes, the shoe illustrated being at the left hand side of Figure 1.

The improved shock absorber disclosed in the drawings is employed as a snubber in connection with truck springs of railway cars, the same being interposed between the top and bottom spring follower plates of the truck spring cluster, being substituted for one or more of the spring units of a cluster of truck springs.

My improved shock absorber comprises broadly a friction casing A; a yoke B; two friction shoes C—C; a pair of springs D—D between the shoes; and a spring E opposing relative movement of the yoke and casing.

The casing A is in the form of a hollow cylinder having a transverse end wall 10 at the upper end. The wall 10 is extended laterally outwardly of the casing, thereby providing an annular flange 11 which acts as a follower. The interior of the casing presents a lengthwise extending, cylindrical friction surface 12.

The yoke B comprises a relatively wide, heavy, platelike member 13 having an annular disclike base portion 14 forming a follower member. The disclike follower 14 has a centrally disposed, upstanding boss 15 from which the plate member 13 projects. At the upper portion thereof the plate member is provided with a substantially rectangular opening 16 adapted to accommodate the friction shoes C—C.

The shoes C—C, which are disposed within the yoke B, are of identical design. Each shoe comprises a relatively thick, platelike section 17, having horizontally disposed, inwardly projecting, top and bottom flanges 18—18. Between the flanges 18—18, the inner side of the shoe is cut out to provide a substantially rectangular spring seat 19. On the outer side, each shoe presents a longitudinally extending, transversely rounded friction surface 20, the curvature of said surface truly fitting the cylindrical friction surface 12 of the casing.

The two shoes C—C are disposed within the yoke B and project from opposite sides of the yoke, with their friction surfaces 20—20 engaging the interior friction surface 12 of the casing at opposite sides of the latter.

The springs D—D, which are preferably two in number, are in the form of horizontally arranged coils interposed between the shoes C—C and having their opposite ends bearing in the seats 19—19 of said shoes. These springs are under predetermined compression, thus forcing the shoes tightly against the friction surfaces of the casing.

The spring E is in the form of a relatively heavy coil surrounding the casing A and yoke B and bearing at its top and bottom ends respectively on the follower flange 11 of the casing and the disclike follower member 14 of the yoke.

In order to accommodate the usual spring centering projections of the top and bottom spring follower plates of the truck spring cluster, the end wall 10 of the casing A and the disclike follower 14 of the yoke are provided with central openings or seats 21—21 into which the projections extend.

The operation of my improved shock absorber is as follows: Upon the spring cluster of the truck of the railway car being compressed between the spring follower plates of the cluster, the yoke B and the friction casing A are moved in lengthwise direction with respect to each other, thereby compressing the spring E and sliding the shoes C—C along the friction surface of the casing, thus providing the required frictional resistance to snub the action of the coils of the truck spring cluster. During recoil of the truck springs, expansion of the spring E returns the parts to the normal position shown in Figure 1.

As will be evident, the frictional resistance provided between the shoes C—C and the casing A being constant during all phases of the operation of my improved shock absorber, the same amount of frictional resistance to snub the action of the springs is provided during both compression and recoil of the truck springs.

I claim:

1. In a friction shock absorber, the combination with a friction casing having a follower flange at the outer end thereof, said casing having lengthwise extending friction surfaces parallel to the central longitudinal axis of the mechanism; of a yoke having a follower member at the outer end thereof, said yoke extending into the casing, and said yoke and casing being relatively movable in lengthwise direction, said yoke having a transverse guide opening therethrough at right angles to said longitudinal axis; a pair of oppositely disposed, laterally displaceable friction shoes within the opening of said yoke, said shoes having sliding frictional engagement with the interior friction surfaces of the casing; spring means interposed between said shoes for spreading the same apart, said spring means being under constant compression; and a spring surrounding said casing and yoke and bearing at opposite ends on the follower flange of the casing and the follower member of the yoke.

2. In a friction shock absorber, the combination with a cylindrical friction casing having a follower flange at the outer end thereof, said casing including a friction shell section which is of uniform diameter throughout its length; of a yoke strap having a follower member at the outer end thereof, said yoke strap extending into the casing, said yoke strap presenting spaced guide walls at right angles to the longitudinal axis of the mechanism, and said yoke strap and casing being relatively movable in lengthwise direction; a pair of oppositely disposed, transversely arranged friction shoes within the yoke strap guided for movement between said spaced walls, said shoes having transversely curved friction surfaces in sliding frictional engagement with the interior of the friction shell section of the casing; a pair of transversely disposed coil springs interposed between said shoes for spreading the same apart, said springs being under constant compression; and a heavy coil spring surrounding said casing and yoke and bearing at opposite ends on the follower flange of the casing and the follower member of the yoke.

EDWARD H. LEHMAN.

REFERENCES CITED

The following references are of record in the file of this patent:

UNITED STATES PATENTS

| Number | Name | Date |
|---|---|---|
| 1,251,930 | Sherman | Jan. 1, 1918 |
| 1,809,908 | Olander | June 16, 1931 |
| 2,216,231 | Dentler | Oct. 1, 1940 |
| 2,265,392 | Olander | Dec. 9, 1941 |
| 2,295,554 | Cottrell | Sept. 15, 1942 |
| 2,356,742 | Bachman | Aug. 29, 1944 |